United States Patent [19]
Getler et al.

[11] Patent Number: 5,685,089
[45] Date of Patent: Nov. 11, 1997

[54] PROCESS AND APPARATUS FOR PRODUCTION OF CERAMIC POWDERS BY SPRAY DRYING

[75] Inventors: Jens Getler, Brønshøj, Denmark; Stuart Gibson, Attleboro Falls, Mass.; Søren Fredsted, Stenløse; Per Nielsen, Bagsværd, both of Denmark

[73] Assignee: APV Anhydro AS, Denmark

[21] Appl. No.: 649,633

[22] PCT Filed: Nov. 22, 1994

[86] PCT No.: PCT/DK94/00436

§ 371 Date: May 23, 1996

§ 102(e) Date: May 23, 1996

[87] PCT Pub. No.: WO95/14644

PCT Pub. Date: Jun. 1, 1995

[30] Foreign Application Priority Data

Nov. 23, 1993 [DK] Denmark ................. 1314/93

[51] Int. Cl.$^6$ ........................................... F26B 3/08
[52] U.S. Cl. ........................... 34/372; 34/89; 34/66
[58] Field of Search ...................... 34/337, 338, 339, 34/340, 349, 351, 363, 364, 370, 372, 373, 589, 65, 66, 75, 76; 159/4.3, 4.4, DIG. 3

[56] References Cited

U.S. PATENT DOCUMENTS

| 3,867,234 | 2/1975 | Smith et al. | 159/4.06 |
| 4,642,904 | 2/1987 | Smith, Jr. et al. | 34/349 |
| 4,731,937 | 3/1988 | Premel et al. | 34/65 X |
| 5,044,093 | 9/1991 | Itoh et al. | 159/DIG. 3 X |
| 5,052,123 | 10/1991 | Tischendorf et al. | 34/65 X |
| 5,223,088 | 6/1993 | Hansen | 34/372 X |

FOREIGN PATENT DOCUMENTS

WO 92/14530  9/1992  WIPO.

*Primary Examiner*—John M. Sollecito
*Assistant Examiner*—Steve Gravini
*Attorney, Agent, or Firm*—Leydig, Voit & Mayer, Ltd.

[57] ABSTRACT

A process for spray drying of ceramic suspensions for the production of a powder which is dust free, sufficiently stable for storage and with good flow characteristics. The ceramic suspension is spray dried in a chamber (1) to a powder with a water content which is 0.1–10% higher than required in the final powder and hereafter fluidized in a fluid bed (6) with ambient air for an evaporative cooling process, whereby the water content is reduced to the required value at the same time as the powder is cooled. The produced powder has a high water content without tendency to lumping.

18 Claims, 1 Drawing Sheet

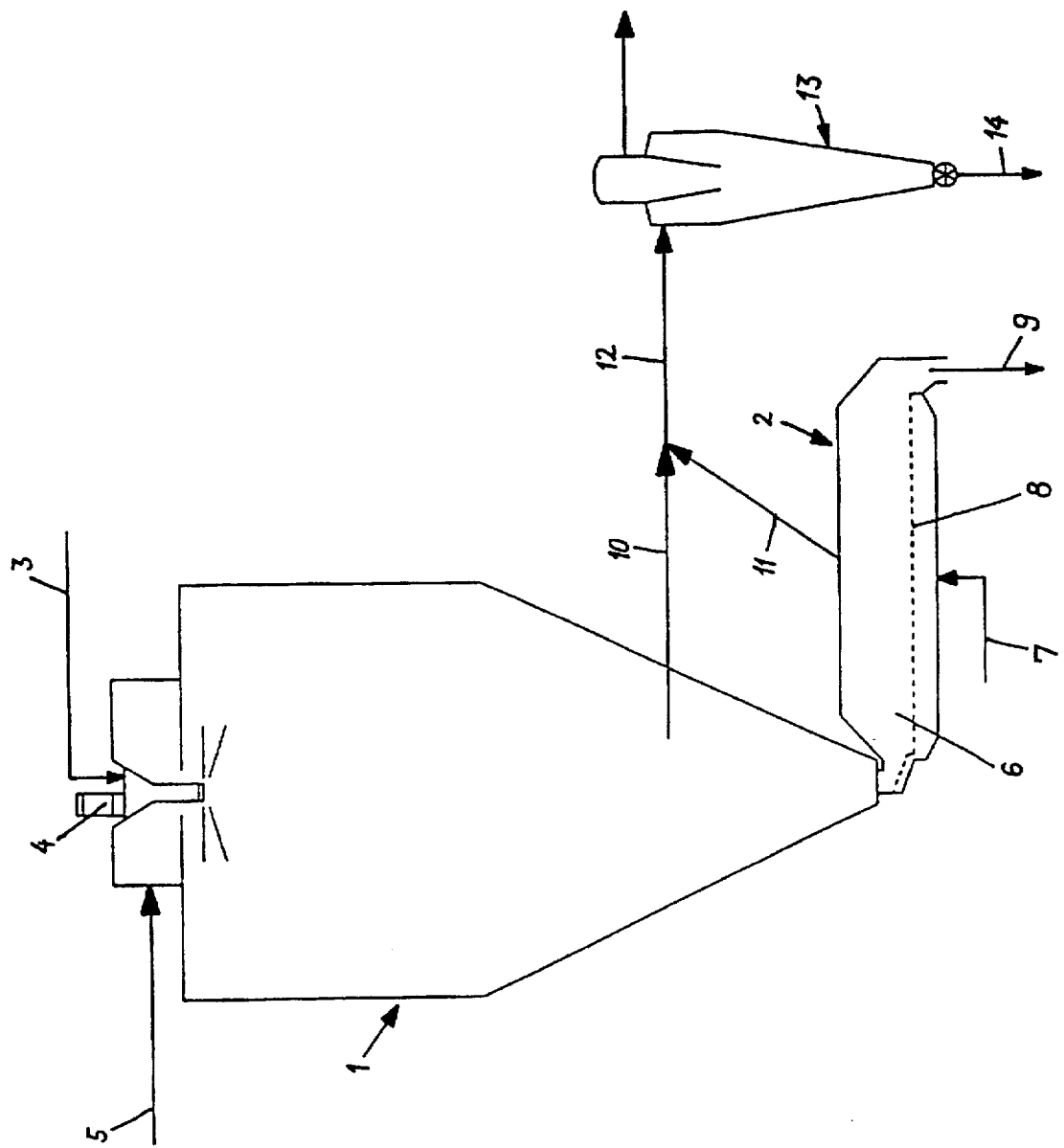

PROCESS AND APPARATUS FOR PRODUCTION OF CERAMIC POWDERS BY SPRAY DRYING

The present invention relates to a process for producing powdered ceramic products by spray drying an aqueous suspension, including dispersants end colorants.

Examples of products produced according to this process are oxides and silicates and similar of Aluminium, Magnesium as well as other metals, such as clay, ferrites, kaolin and stearite. The powdered products are used within various fields such as filler and coating of paper, ceramics, catalyst carriers etc.

Dispersants and colorants are organic components which will decompose if they are exposed to high temperatures for a relatively long period of time. It is therefore important, when drying suspensions including dispersants and colorants, to use a drying process that expose the suspensions to a minimum of heat treatment.

A well-known industrial process to dry suspensions of ceramic products is one-stage spray drying, cf. Masters, K., Spray Drying Handbook, 1991 p. 569 ff. By this process a kaolin powder with 0.5–3.0% residual free moisture is obtained by using drying air inlet temperatures of e.g. 400°–600° C. and outlet temperature of 95°–120° C. (p. 504).

The emphasis An prior art has been to reduce total energy consumption by scrubbing and/or heat exchanging the suspension with the spent drying gas, which has a relatively high temperature.

This forms a part of a number of prior art patents.

U.S. Pat. No. 4,642,904 describes a system in which a clay slurry is dewatered by scrubbing and then preheated by heat exchangers before it is spray dried in one stage to a powder with about 1% residual free moisture.

U.S. Pat. No. 4,717,559 describes a method in which calciner waste heat is used for supplying heat to the suspension before a one-stage spray drying process.

WO 92/14530 describes a process in which a feed of kaolin slurry passes a heat exchanger and a flash concentrator before being spray dried in a one-stage spray drying process.

U.S. Pat. No. 3,867,234 describes a process in which a ceramic product is spray dried to a dry powder in a one-stage spray drying process. The dry powder is guided to the discharge opening by ambient air in a double helix-shaped, sloped fluidized bed. The ambient air assumes free flow of the dry powder to the product outlet.

Known processes for spray drying of ceramic suspensions are one-stage drying processes. The produced powders are suitable for storage, however, they are often very dusty due to a fine particle size end low free moisture content and they have poor flow properties.

With a view of avoiding these drawbacks it has been suggested to produce dust free and free flowing ceramic powders with large particle size and increased free moisture content in a one-stage spray drying process. This is possible by operating at decreased outlet temperatures, a process well known to a person skilled in the art. By doing so, however, powders will inevitably form unacceptable lumps during storage.

It has now turned out that ceramic suspensions, as defined above, can be spray dried into a powder with the above mentioned good properties using a process characterized in that:

(a) in a 1st stage the suspension is spray dried to a powder with a free moisture content in the powder that is higher than the free moisture content in the final powder, (b) An an immediate succeeding 2nd stage the powder is cooled evaporative with ambient air to reach its final free moisture content.

The powder produced according to the invention is dust free, stable during storage, it has good flow properties, and has a uniform and high bulk density as well as good dispersing properties. Suspensions dried as per this process are exposed to a minimum of heat treatment, which is important for suspensions containing organic components such as dispersants and brighteners.

The process is specially appropriate for spray drying of products which, due to a small primary particle size, are not easily spray dried into a dust free, free-flowing, high quality powder suitable for storage. Furthermore, the process opens possibilities of savings in operation as well as investment costs.

By using this procedure the powder is cooled as a consequence of evaporation of moisture in the powder. The energy required for the evaporation equals the energy released when the powder is cooled. In the well-known two-stage drying processes, as per above p. 587, energy must be provided by means of hot air to the first part of the fluid bed, and the cooling is performed by cold air.

In the above-mentioned U.S. Pat. No. 3,867,234 a fluid bed is present at the outlet of the spray drying apparatus. The fluid bed is, hovever, open in one side and the apparatus does not allow for any drying of moist from the spray drier. According to the description, the purpose of the fluid bed is merely to guide the dry powder to the discharge opening.

The process according to the invention makes it possible to dry suspensions for the production of powders with properties which have hitherto been regarded non-obtainable e.g. storable, homogeneous, free flowing and dust less kaolin powder with a relatively high water consent. It leads to an improved heat economy for a given product quality in relation to what is considered possible by using the prior art as mentioned in above Masters p. 569.

By using a special procedure according to the present invention the atomization of the suspension is performed by means of a centrifugal atomizer with continuously variable revolutions per minute. It is then possible to adjust the particle size of the final powder as well as to obtain a technical effect in form of a continuous adjustment and control of the water content in the powder led into the the fluid bed with higher accuracy than has hitherto been possible, based on measurements of the outlet temperature of the drying air.

In a preferred embodiment according to the invention, the temperature of the outlet air from the first stage is controlled within the range of 50° to 100° C.

In a further embodiment according to the invention, the temperature of the outlet air from the first stage is controlled to obtain a free moisture content in the range of 0.5 to 30% in the powder leaving the first stage. The free moisture content in the powder from the second stage is preferably in the range of 0 to 30%.

In a preferred embodiment according to the invention, peripheral velocity of the centrifugal atomizer wheel of between 50 and 90 m/s is used. As a result it is possible to produce large, free-flowing particles.

The following is a detailed description of the invention with reference to the drawing, which is a schematic representation of an apparatus suitable for performing the procedure, consisting of a spray drying chamber 1 with a fluidized bed 2.

The suspension is added through the pipe 3 and is atomized by the centrifugal atomizer 4 into the chamber 1, where by means of hot air which is added through duct 5, the droplets are dried to a water content which is up to 10 percentage points higher than required in the final powder.

The powder falls down into the fluidized bed 6 and is fluidized by means of ambient air added through duct 7 and the perforated plate 8. An evaporation to the required water content takes place while the powder is cooled. The final powder leaves the fluid bed at 9 and can be led to storage (not illustrated). Drying air from the spray drying chamber and from the fluid bed is led through the ducts 10 and 11 to duct 12. Fine particles are separated in the cyclone 13 end led to storage via the outlet (not illustrated).

It is to be noted that the procedure according to the invention is not limited to be performed in a two-stage apparatus as illustrated, but can be performed in other combinations of a spray drying chamber with equipment for pneumatic evaporative cooling.

The process of the present invention will be further explained by comparing the following two examples, whereof Example 1 describes the beforementioned prior art and Example 2 describes the present invention.

EXAMPLE 1

Was performed in a one-stage spray drying plant as depicted in the above mentioned Masters 5. ed FIG. 4.10a. The spray drying chamber had a cylindrical diameter of 12.5 m and a total height of 23 m. 50.000 kg/h of a suspension of kaolin with 55% total solids end a temperature of 60° C. was fed to a centrifugal atomizer with wheel diameter 400 mm, rotating at 3500 rpm. The drying air inlet/outlet temperatures were 500°/95° C. The produced, dry kaolin power had a residual free moisture content of 0.5%. According to internal standards it was very dusty with poor flow properties; it did not form lumps during storage.

EXAMPLE 2

Is performed according to the present invention in two stages. The same spray dryer as in example 1 performs the 1st drying stage. From this dryer the powder falls into a fluid bed with 8 m² sieve plate area where it is fluidized with unheated ambient air at 25° C. The spray dryer air inlet/outlet temperatures are 300°/70° C.

Kaolin powder from the spray dryer chamber has 7% free moisture, which is reduced to 5% during the evaporative cooling in the fluid bed.

The powder is non-dusting with good flow properties. It does not form lumps during storage.

We claim:

1. A process for producing powdered ceramic products by spray drying an aqueous suspension of ceramic material, dispersants, and colorants, comprising
   (a) spray drying the suspension in a 1st stage to a powder with a free moisture content in the powder that is higher than the free moisture content in the final powder, and
   (b) evaporatively cooling the powder in an immediate succeeding 2nd stage with ambient air to reach its final free moisture content.

2. The process according to claim 1, wherein the free moisture content of the powder from the 1st stage is up to 10 percentage points higher than the free moisture content in the final powder.

3. The process according to claim 2, wherein the temperature of the outlet air from the 1st stage is controlled within the range of 50° to 100° C.

4. The process according to claim 3, wherein the temperature of the outlet air from the 1st stage is controlled to obtain a free moisture content in the range of 0.5 to 30% in the powder leaving the 1st stage.

5. A process according to claim 4, wherein the free moisture content in the powder from the second stage is in the range of 0 to 30%.

6. An apparatus for carrying out the process according to claim 1 comprising (a) a spray dryer wherein the 1st drying stage is carried out and (b) an evaporative cooler adapted to supply ambient air directly into the powder in the 2nd stage.

7. The apparatus according to claim 6, wherein the evaporative cooler is a fluid bed.

8. The apparatus according to claim 6, wherein the spray dryer comprises a centrifugal atomizer wheel with continuously variable revolutions of the centrifugal atomizer wheel.

9. The apparatus according to claim 8, wherein the peripheral velocity of the centrifugal atomizer wheel is continuously variable in the range of 50 to 90 m/s.

10. A method of producing a powdered ceramic product, which method comprises the use of an apparatus according to claim 6 for the production of a powdered ceramic product which includes dispersants and colorants.

11. The process according to claim 1, wherein the temperature of the outlet air from the 1st stage is controlled within the range of 50° to 100° C.

12. The process according to claim 1, wherein the temperature of the outlet air from the 1st stage is controlled to obtain a free moisture content in the range of 0.5 to 30% in the powder leaving the 1st stage.

13. The process according to claim 1, wherein the free moisture content in the powder from the second stage is in the range of 0 to 30%.

14. An apparatus for carrying out the process according to claim 5 comprising (a) a spray dryer wherein the 1st drying stage is carried out and (b) an evaporative cooler adapted to supply ambient air directly into the powder in the 2nd stage.

15. The apparatus according to claim 14, wherein the evaporative cooler is a fluid bed.

16. The apparatus according to claim 14, wherein the spray dryer comprises a centrifugal atomizer wheel with continuously variable revolutions of the centrifugal atomizer wheel.

17. The apparatus according to claim 16, wherein the peripheral velocity of the centrifugal atomizer wheel is continuously variable in the range of 50 to 90 m/s.

18. A method of producing a powdered ceramic product, which method comprises the use of an apparatus according to claim 14 for the production of a powdered ceramic product which includes dispersants and colorants.

* * * * *